US012659161B2

(12) United States Patent
Munshi et al.

(10) Patent No.: US 12,659,161 B2
(45) Date of Patent: Jun. 16, 2026

(54) PROVIDING AUTHENTICATION IN A NETWORK

(71) Applicant: Comcast Cable Communications, LLC, Philadelphia, PA (US)

(72) Inventors: Soumya Munshi, Campbell, CA (US); Narendra Varma Dandu, Sunnyvale, CA (US); Raja Shah, San Jose, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/592,919

(22) Filed: Mar. 1, 2024

(65) Prior Publication Data

US 2025/0279893 A1 Sep. 4, 2025

(51) Int. Cl.
*H04L 9/32* (2006.01)
*H04W 12/03* (2021.01)
*H04W 84/12* (2009.01)

(52) U.S. Cl.
CPC ........... *H04L 9/3226* (2013.01); *H04W 12/03* (2021.01); *H04W 84/12* (2013.01)

(58) Field of Classification Search
CPC ...... H04L 9/3226; H04W 12/03; H04W 84/12
See application file for complete search history.

(56) References Cited

U.S. PATENT DOCUMENTS

| | | | |
|---|---|---|---|
| 8,724,813 B2 | 5/2014 | Saboff et al. | |
| 2009/0203349 A1* | 8/2009 | Hollstien | G08B 25/10 |
| | | | 340/539.11 |
| 2017/0006504 A1* | 1/2017 | Townend | H04W 28/0257 |
| 2019/0313246 A1 | 10/2019 | Nix | |
| 2021/0194681 A1 | 6/2021 | Nix | |
| 2022/0312203 A1 | 9/2022 | Yamakawa | |
| 2023/0039159 A1* | 2/2023 | Lynch | H04W 12/33 |
| 2023/0133145 A1* | 5/2023 | Alvarez | G16H 10/65 |
| | | | 726/7 |

FOREIGN PATENT DOCUMENTS

EP 1836830 A2 9/2007

* cited by examiner

*Primary Examiner* — Mohammad W Reza
(74) *Attorney, Agent, or Firm* — Banner & Witcoff, Ltd.

(57) ABSTRACT

Methods are described for use of encryption methods for multiple network groups with different passkeys. A gateway may be configured so that the gateway may manage an authentication process of particular or pre-identified devices wireless devices differently from other devices. The gateway may determine if the device is a pre-identified device and if the passkey used by the device is an authorized passkey, and may authenticate the device using a particular encryption method.

20 Claims, 13 Drawing Sheets

300

400

Welcome to Darlene's Texas BBQ
The Wi-Fi is named "Getting Saucy"
The Wi-Fi password is: PassTheWetWipes

450

Welcome to Darlene's Graduation
Use the QR code to join the network

The Wi-Fi password is:
TheGoodTimesAreOver

500

| Group Name 505 | Encryption protocol 510 | (SAE or PSK) and Key 515 | IDs of connected devices 520 | Network Resources 525 | Active Network 530 | Network Group End 535 |
|---|---|---|---|---|---|---|
| Guest1 | WPA2 | (PSK) PW2 | • ID 1<br>• ID 2 | Internet | Yes | Indefinite |
| Guest2 | WPA2 | (PSK) PW3 | | Internet<br>Printer | No | November 11, 2022, 12:00 AM |
| PrinterAccess | WPA2 | (PSK) PW4 | | Internet<br>NAS1 | Yes | January 9, 2024, 10:00 AM |
| Guest4 | WPA2 | (PSK) PW5 | | Internet<br>Music | No | January 1, 2023, 3:00 AM |
| Kids 1 | WPA2 | (PSK) PW6 | • ID 3 | Internet_kid<br>Music<br>NAS2<br>Video_kid | Yes | Indefinite |
| Kids 2 | WPA2 | (PSK) PW7 | • ID 4 | Internet<br>Music<br>NAS2<br>Video | Yes | Indefinite |
| Administrator | WPA3 | (SAE) PW1 | • ID 5<br>• ID 6<br>• ID 7 | Internet<br>Music<br>NAS1<br>NAS2<br>NAS3<br>Printer<br>Video | N/A | N/A |

| Device Identification | WPA2/multi-PSK enabled groups | When connected |
|---|---|---|
| ID 1 | Guest 1 | 12312022 18:26:32 |
| ID 2 | Guest 1 | 12312022 17:01:24 |
| ID 3 | Kid 1 | 11012022 07:02:23 |
| ... | | ... |

| ID | Network Group | Network Group Passkey |
|---|---|---|
| ID 8 | PrinterAccess | PW3 |
| ID 10 | Guest1 | PW2 |
| ID 12 | Guest1 | PW2 |
| ... | | ... |

FIG. 5C

PROVIDING AUTHENTICATION IN A NETWORK

BACKGROUND

Common wireless security protocols, such as WPA2, use multiple pre-shared key (multi-PSK) encryption algorithms. Multi-PSK allows a network administrator to create multiple network groups associated with a different pre-shared key, and provide different network resources to the network groups. Newer wireless security protocols, such as WPA3, aim to address vulnerabilities, such as brute force "diction-ary" attacks. However, such protocols often use simultane-ous authentication of equals (SAE) encryption methods that come with other shortcomings, that are identified and addressed by the disclosure.

SUMMARY

The following summary presents a simplified summary of certain features. The summary is not an extensive overview and is not intended to identify key or critical elements.

Methods are described for enabling connection to a net-work that is configured to use a first security protocol by using a second security protocol. The network may establish a connection, for example, between a wireless device and the network using multi-PSK encryption in a SAE enabled wireless network. A gateway may be configured to monitor for logins from specific devices and/or for login failures to the network using passkeys other than the passkey associ-ated with the first security protocol and to handle those logins differently. The gateway may be configured, for example, with a network group that may use the first security protocol yet have other network groups that may use other security protocols. The gateway may be configured, for example, with a set of alternative passkeys, other than a primary passkey, and provide access to other network groups with different, and/or limited, network resources associated with the alternative passkey. The gateway may be configured to give access to all capabilities of the network or to give limited access to the network, for example, depending on whether a SAE or multi-PSK passkey is provided.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIGS. 5A through 5C are example tables for enabling an enhanced SAE encryption protocol.

DETAILED DESCRIPTION

Figure 1:
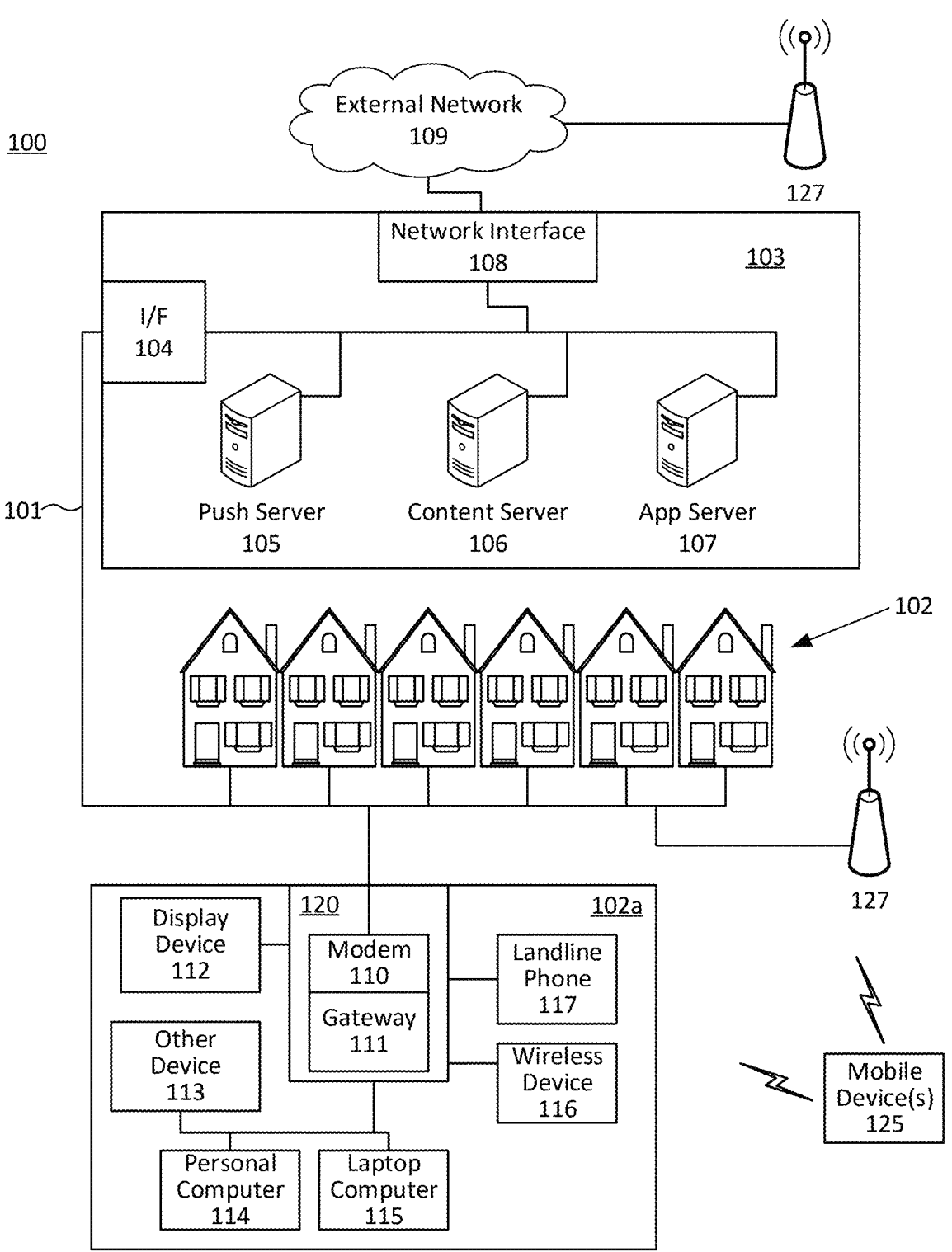
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream infor-mation signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 config-ured to communicate with one or more mobile devices 125 via one or more wireless networks. The mobile devices 125 may comprise smart phones, tablets or laptop computers with wireless transceivers, tablets or laptop computers com-municatively coupled to other devices with wireless trans-ceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communi-cations among those devices, to manage communications between those devices and backend devices such as servers 105-107, and/or to manage communications between those devices and one or more external networks 109. The inter-face 104 may, for example, comprise one or more routers, one or more base stations, one or more optical line terminals (OLTs), one or more termination systems (e.g., a modular cable modem termination system (M-CMTS) or an inte-grated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional push, content, and/or application servers, and/or other types of servers. Although shown separately, the push server 105, the content server 106, the application server 107, and/or other server(s) may be combined. The servers 105, 106, 107, and/or other servers, may be computing devices and may comprise memory storing data and also storing computer executable instructions that, when executed by one or more processors, cause the server (s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
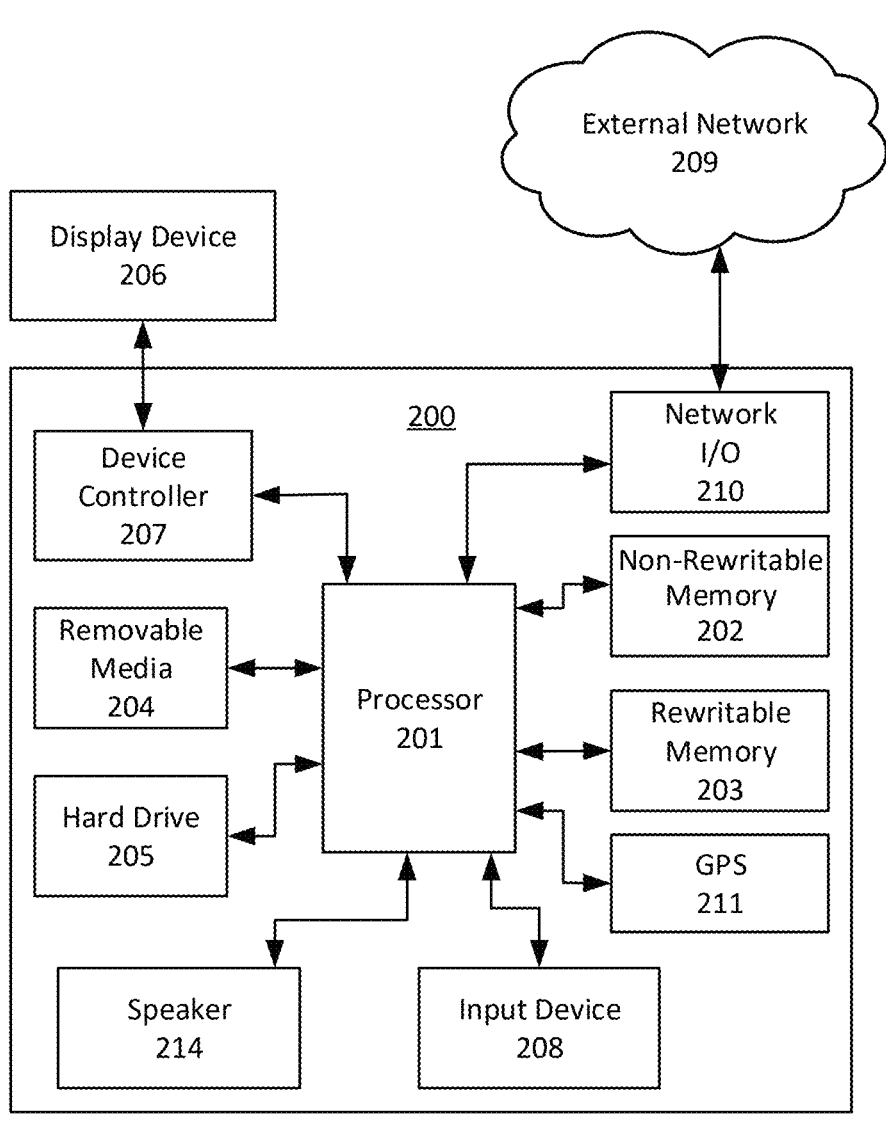
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., wireless devices, gateways, etc.) The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3A:
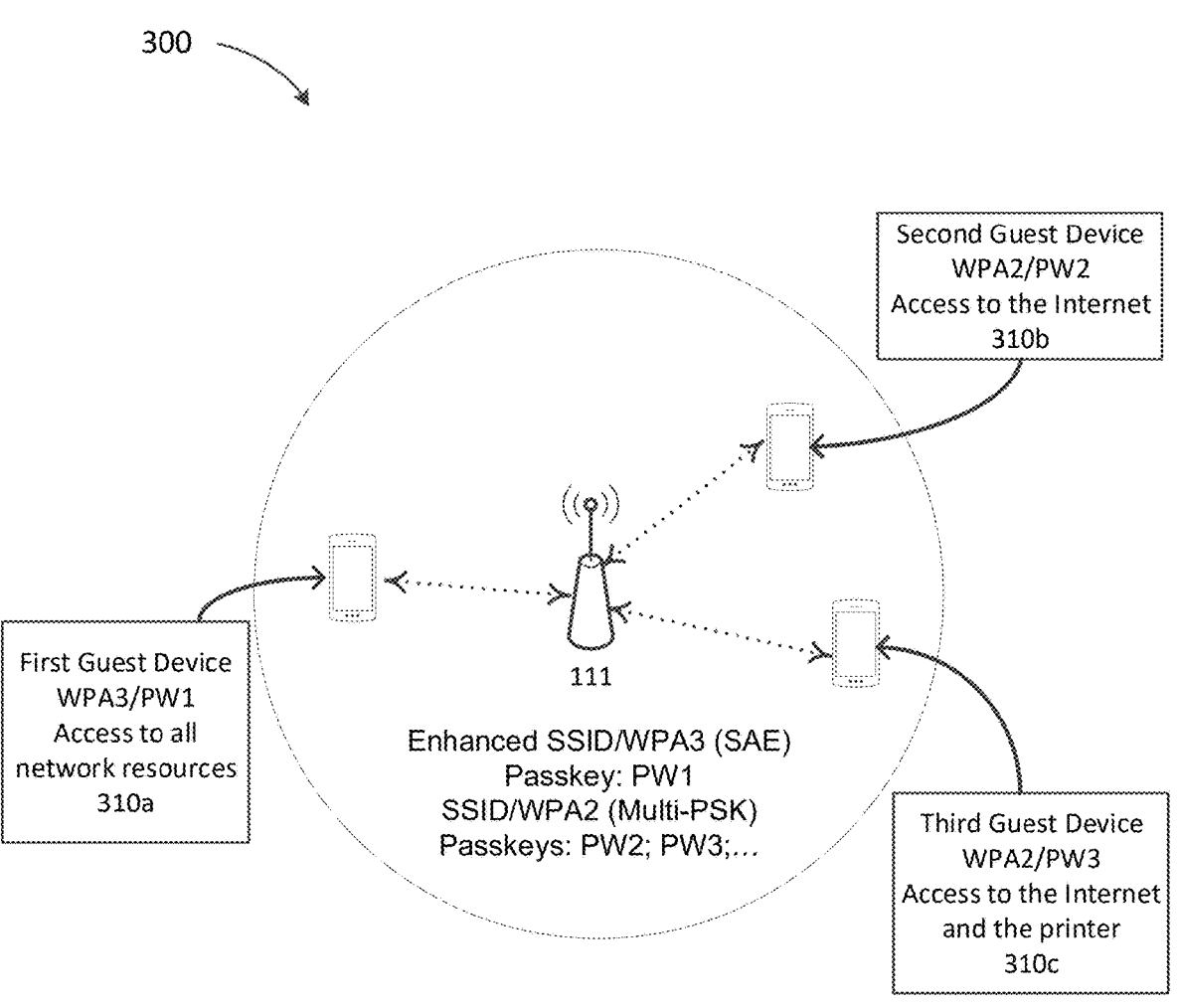
FIGS. 3A through 3C shows an example network, devices connected to a gateway of the network, and encryption protocols used to authenticate the devices.
Figures 3B, 3C:
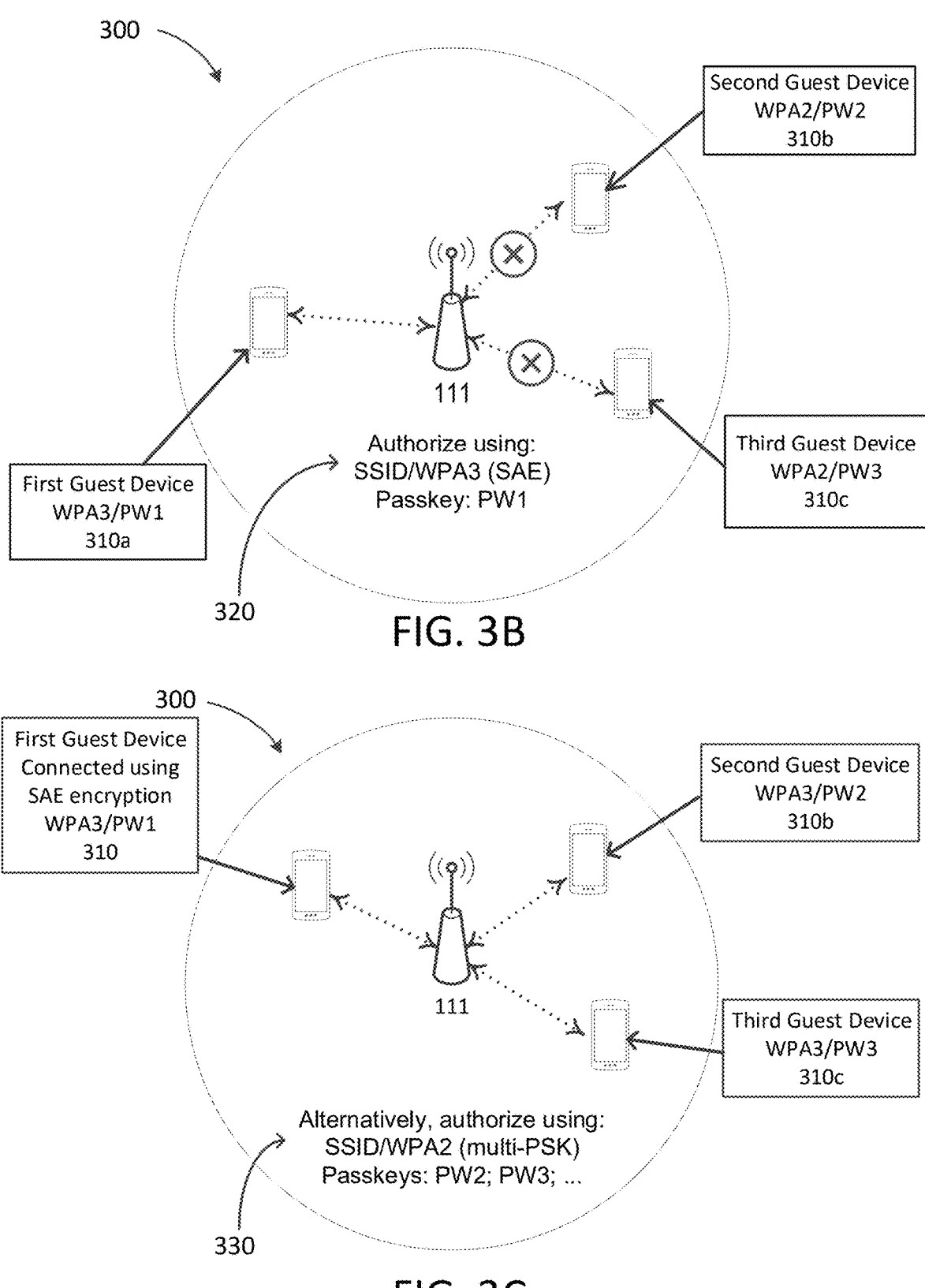

For purposes of the following, devices that use encryption methods to connect wired and/or wireless devices to networks (e.g., gateways, access points, range extenders, etc.) may be considered gateways. FIGS. 3A through 3C shows an example network, devices connected to a gateway of the network, and encryption protocols used to authenticate the devices. FIG. 3A shows an example of a network 300 that supports an enhanced simultaneous authentication of equals (SAE) authentication encryption protocol (e.g., Wi-Fi protected access 3 (WPA3)). A network 300 that supports enhanced SAE encryption may use a single pre-shared key plus one or more additional passkeys per service set identifier (SSID). An enhanced SAE method may use a SAE authentication encryption protocol, but may be further configured to distinguish and/or accept one or more additional passkeys. The gateway may be configured to use the one or more additional passkeys with an alternate encryption protocol (e.g., Wi-Fi protected access 2 (WPA2)) based on a failure to authenticate using the SAE authentication encryption protocol and/or based on an identification (e.g., a media access identification (MAC ID)) of the guest device.

A gateway 111 may transmit a beacon message indicating details of the gateway 111. The gateway 111 may transmit a beacon message, for example, comprising an identification (e.g., the SSID) of the gateway 111 and/or a primary encryption method used (e.g., SAE) for authentication. A wireless device (e.g., a first guest device 310a, a second guest device 310b, and/or a third guest device 310c) may receive the beacon message. A wireless device may send a probe request message, for example, if the wireless device receives the beacon message and wishes to join the network. The probe request message may indicate a passkey and/or an identification of the wireless device. The passkey may have been given to the user of a wireless device via an administrator of the gateway 111. The passkey may have been given to the wireless device via a web-link (e.g., a QR code a network administrator provides to guests). Access to the network 300 resources, by a wireless device, may depend on the passkey and encryption method used.

Like SAE, enhanced SAE may have a single passkey that may be the SAE passkey and authentication between the gateway 111 and a device (e.g., a first guest device 310a, a second guest device 310b, a third guest device 310c, etc.) may proceed using the SAE encryption method. A first guest device 310a may attempt to connect to the network 300 using the SAE passkey (e.g., PW1), for example, by sending a probe request to the gateway 111 comprising the SAE passkey (e.g., PW1) and, if the passkey is the correct SAE passkey, the first guest device 310a may be authorized to connect to the network 300 using SAE encryption and after authentication, have access to all the network 300 resources. Benefits associated with multi-PSK networks may be lost if only a SAE authentication encryption protocol is enabled. Specifically, a network may not be able to create separate login groups with different network access capabilities, for example, if only a single passkey is permitted to join a network. Alternatively, to enhanced SAE, an administrator may configure multiple gateways with different SSIDs using different authentication encryption methods, but this may be costly to build and/or maintain.

FIG. 3B shows an example of a network 300 that supports enhanced SAE using an SAE encryption protocol 320 with a unique passkey (e.g., PW1) on devices requesting to join the network 300. Enhanced SAE maintains advantages that have made the SAE encryption method the encryption standard for WPA3. The advantages of SAE encryption, for example, may include a more secure handshake mechanism for establishing connections, easier, more secure connections of new devices, and increased passkey sizes. A gateway 111 configured to use the enhanced SAE encryption method may have a single passkey (e.g., PW1) that allows devices to connect to the network 320 using SAE authentication. A first guest device 310a may connect to the network 300 using SAE authentication, for example, if the first guest device provides the proper SAE passkey (e.g., PW1) assigned to the network 300 SAE network group. A second guest devices 310b and/or a third guest device 310c may not be permitted to connect to the network 300 using SAE authentication, for example, if the second guest device 310b and/or third guest device 310c used a passkey (e.g., PW2, PW3, etc.) that differs from the SAE passkey (e.g., PW1), or alternatively, if the second guest device 310b and/or third guest device 310c may have been approved to use an alternate encryption method by an administrator of the network 300. Devices that are authenticated using the SAE passkey (e.g., PW1) may have access to all available network 300 resources, and devices that fail authentication using SAE encryption (e.g., by using a passkey that differs from the SAE passkey) may have no access to network 300 resources using SAE encryption, but may have access to a limited set of network 300 resources if using enhanced SAE encryption and authentication succeeds using an approved alternative encryption protocol (e.g., WPA2/multi-PSK).

In an enhanced SAE encryption method, one or more additional passkeys may be multi-PSK passkeys, wherein each multi-PSK passkey may be associated with a unique login group that has access to a defined, and potentially limited, set of network resources (e.g., printers, the Internet, etc.). A gateway 111 using enhanced SAE encryption may be configured to monitor SAE encryption failures and/or to monitor for pre-approved wireless devices. A second guest device 310b and/or a third guest device 310c may attempt to connect to the network 300 using passkeys that may differ from the SAE passkey (e.g., PW2, PW3, etc.). The second guest device 310b and/or a third guest device 310c may be identified as an approved device and/or the second guest device 310b and/or the third guest device 310c may fail a SAE authentication. The second guest device 310b may fail SAE authentication but may be authenticated using a multi-PSK method, for example, if the network 300 SAE passkey is PW1, a multi-PSK network 300 group passkey is PW2, and the second guest device 310b sends a probe request to the gateway 111 including the PW2 passkey. The second guest device 310b may join the network 300 and have access to a limited number of network 300 resources. The second guest device 310b may have access to the Internet, for example, if the network 300 group, associated with the passkey provided in a probe request by the second guest device 310*b*, is configured to have access to the Internet.

Also, or alternatively, a gateway 111 using enhanced SAE encryption may have identifications (e.g., MAC IDs) of wireless devices that may be pre-approved to use an alternative authentication method. The gateway 111 may use an alternate encryption method (e.g., multi-PSK) for a second guest device 310*b* and/or a third guest device 310*c*, for example, if the gateway 111 recognizes the second guest device 310*b* and/or the third guest device 310*c* as a wireless device approved to use an alternate encryption method. The gateway 111 may use WPA2/multi-PSK encryption with an assigned multi-PSK passkey to authenticate the third guest device 310*c*, for example, if the gateway 111 determine that a third guest device 310*c* is a pre-approved device.

FIG. 3C shows an example of the network 300 that supports enhanced SAE using a multi-PSK encryption method 330 with a one or more passkeys (e.g., PW2, PW3, etc.). A gateway 111 in a network 300 configured to support multi-PSK (e.g., WPA2) may be configured to support multiple network groups wherein each network group has access to different network resources (e.g., printers, Internet access, hard drives containing image files, video files, and/or audio files, etc.). A network 300 that supports a multi-PSK encryption protocol (e.g., WPA2/multi-PSK) may have a plurality of available network groups with different keys (e.g., PW2, PW3, etc.) simultaneously associated with a SSID that a plurality of wireless device 310*a*-310*c* (e.g., a first guest device, a second guest device, a third guest device, etc.) may connect to. Each wireless device may connect to a different network group, with a unique passkey, that has access to a different set of network 300 resources. A wireless device (e.g., a second guest device 310*b*, and/or a third guest device 310*c*) may only need to access the Internet, and/or an administrator of a gateway 111 may desire to provide only Internet access to most wireless devices (e.g., the second guest device 310*b*, etc.) and/or limit other network access (e.g., network attached storage (NAS), printers, etc.) to specific wireless devices (e.g., the third guest device 310*c*).

The gateway 111 in FIG. 3C may have been configured with one or more passkeys (e.g., PW2, PW3, etc.) that allow access to different network groups of the network 300. The one or more passkeys may comprise a set of allowable passkeys. A wireless device (e.g., a first guest device 310*a*, a second guest device 310*b*, a third guest device 310*c*, etc.) may be allowed access based on the passkey provided in a probe request. The first guest device 310*a* may fail authentication and not be allowed to join the network 300, by the gateway 111*a*, for example, if the passkey (e.g., PW1) is not a member of the set of allowable passkeys. The second guest device 310*b* and/or the third guest device 310*c* may pass authentication and be allowed to join the network 300, by the gateway 111*a*, for example, if the passkeys that the second guest device 310*b* and/or the third guest device 310*c* may have provided in their probe requests were members of the set of allowable passkeys. The second guest device 310*b* and/or the third guest device 310*c* may be allowed access to different network 300 resources depending on a network group that may be identified by the passkey used.

Figure 4A:
FIGS. 4A and 4B are examples means for network admin-istrators to share Wi-Fi login details.
Figure 4B:
Figure 4B:

FIGS. 4A and 4B are example means for network administrators to share Wi-Fi login details with guests. Sharing Wi-Fi networks with guests is common. If a person visits a premises open to the public (e.g., a restaurant, a movie theater, a mall, a library, etc.) very often the place may have a Wi-Fi network and may share the network details with the public. If a person visits a host, the host may share, with the guest, the details necessary to join the host's Wi-Fi network. A guest at a public place or at an event of a host, may not know (or care) how their device connects to a network. The guest may simply attempt to have their guest device join an identified network using a given passkey. Identification of the guest device (e.g., a media access control identification (MAC ID)) may be determined and stored, if a guest decides to join a network. A business and/or a host may share the network login information using a variety of methods. The business and/or host may, for example, share the network login information verbally, provide the login information in written form and/or provide a link for the wireless device to follow.

FIG. 4A shows an example of an SSID of a Wi-Fi network (e.g., Getting Saucy) and a pre-shared key (e.g., Pass-TheWetWipes) necessary to join the Wi-Fi network (e.g., Getting Saucy) written on a sign and/or a piece of paper. A business and/or a host may have a sign and/or provide a card 400 that gives the necessary Wi-Fi login information. A guest may find an identified network (e.g., Getting Saucy) from a list of network beacons that a guest device receives, and the guest may attempt to have the guest device join the identified network using the given passkey if prompted. Joining the network may require the user of the guest device to share information (e.g., personal information, an email address, etc.).

FIG. 4B shows an example of a link to a network login site and a passkey necessary to join the network. A link (e.g., a QR code), for example, may be given to guests, by a host, so that the guest may have access to the Internet while at an event. A guest device may go to a network sign in page using the link (e.g., a QR code). The passkey may be used by the user of a device to authenticate their device with the network, and the network gateway may receive the MAC ID of the guest device. The network may receive the guest device's MAC ID, for example, if the guest device goes to the site identified by the link on the card and the MAC ID of the guest device is shared.

FIGS. 5A through 5C are example tables for enabling an enhanced SAE encryption method. FIG. 5A shows an example of a network group table 500 that may be used by a gateway to determine available network groups and/or details associated with a network groups. A network group table 500 may comprise information on a plurality of network groups. The network group table may comprise a plurality of entries, with each entry comprising a group name 505 (e.g., Guest1, Guest2, Kids1, Administrator, etc.) for a group associated with the entry, the encryption protocol 510 used (e.g., WPA2, WPA3, etc.) by devices of the group, the passkey 515 used by devices of the group, identification information of connected devices 520 of the group, network resources 525 allowed for devices of the group, an active network 530 group parameter associated with the group, and/or the network group end 535 (e.g., a time that the network group may become inactive).

A gateway may use network group table 500 to determine active network groups, devices that may be connected to a network group, and/or network resources that may be available to connected devices. A network group name 505 may be simple (e.g., Guest1) and/or descriptive (e.g., PrinterAccess or Kids 1) of the group associated with the entry. IDs of connected devices 520 may indicate devices currently and/or formerly connected to a network group (e.g., ID 3 connected to Kids 1). Network resources 525 may detail the resources (e.g., network attached storage (NAS), printers, the Internet, etc.) of a network group (e.g., the Internet and printer for the network group PrinterAccess) that may be used by and/or available to devices connected to the network group. An active network 530 group parameter may indicate if a network group may be available for a device to connect to. The active network 530 parameter may indicate, for example, if a network group is still available for a device to connect to and/or remain connected to. A network group end 535 may indicate the duration a network group may be active. The network group end 535 may indicate a time and/or be indefinite, for example, if a network group is configured to end after a duration, at a specific date and time, and/or if a network group is configured to be indefinite.

FIG. 5B shows an example of a device connection table 550 that may be used by a gateway to determine devices that may be connected and/or details of the connection. A device connection table 550 may comprise a plurality of wireless devices currently and/or formerly connected to a network group, the network group name a wireless device, of the plurality of wireless devices, may be connected to, and/or a time stamp of when a device may have connected to the network group. A device connection table 550 may provide details of when a device may have disconnected from a network group and/or a length of time the device may be connected to a network group.

FIG. 5C shows an example of an approved wireless device table 575 that a gateway may use to determine if a wireless device may be approved to use an encryption method different from that the gateway may include in a beacon. A wireless device table 575 may comprise a list of wireless devices that may have been approved to use an encryption method, for example, other than SAE. The wireless device table 575 may further comprise a network group that the wireless device may be approved to connect to and/or a network group passkey assigned to the network group that the wireless device may be approved to connect to.

FIGS. 6A through 6D are a flow chart showing an example method for enabling an enhanced SAE encryption protocol. One, some, or all steps of the example method of FIGS. 6A through 6D may be performed by a gateway 111, and for convenience FIGS. 6A through 6D will be described below in connection with the gateway 111. Also, or alternatively, one, some, or all steps of the example method of FIGS. 6A through 6D may be performed by one or more other computing devices. One or more steps of the example method of FIGS. 6A through 6D and/or one or more communications described in connection with the methods of FIGS. 6A through 6D, may be rearranged (e.g., performed, sent, and/or received in a different order), omitted, and/or otherwise modified, and/or other steps and/or communications added. A communication described in connection with the example method of FIGS. 6A through 6D need not be a single message nor contained in a single packet, block, and/or other transmission unit. The gateway 111 and/or other computing devices may be caused to perform one, some, or all steps of the example methods of FIGS. 6A through 6D by one or more processers of the devices executing instructions stored in memory.

Figure 6A:
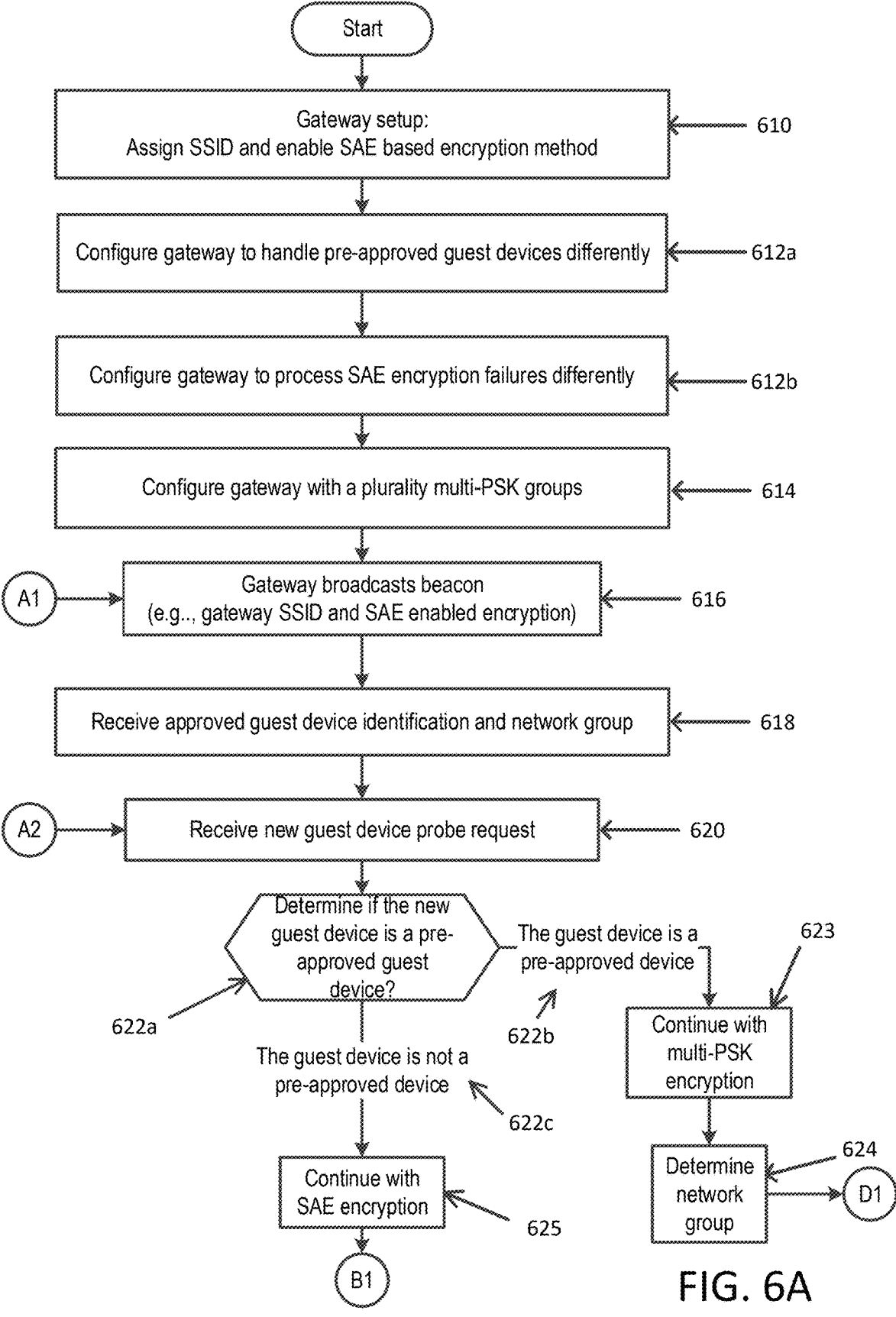
FIGS. 6A through 6D is a flow chart showing an example method for enabling an enhanced SAE encryption protocol.

In FIG. 6A, steps 610 through 614 show steps that may be taken to prepare a gateway for enhanced SAE encryption. In step 610, the gateway 111 may be assigned an SSID and an authentication encryption method to be used (e.g., WPA3/SAE). Step 610 may, for example, comprise a gateway loading a default SSID and/or a encryption method from internal storage. The SSID and/or encryption method may be changed and/or updated by a network administrator. In step 612a, the gateway may be configured (e.g., based on inputs received by the gateway) to monitor authentication attempts for guest devices with specific device identifications (e.g., specific MAC IDs). In step 612b, the gateway may be configured (e.g., based on inputs received by the gateway) to monitor SAE authentication encryption attempts for failures and to process the SAE authentication failures as described herein. In step 614, a gateway may be configured (e.g., based on inputs received by the gateway) with multiple pre-shared keys (e.g., a network group table as described herein in FIG. 5A).

While a gateway is active, the gateway may broadcast a gateway beacon. In step 616, the gateway may broadcast a gateway beacon comprising the SSID and that the authentication method the gateway may be configured to use (e.g., SAE encryption). In step 618, the gateway may receive one or more pre-approved device identifications (e.g., a pre-approved wireless device table as described herein in FIG. 5C) and/or one or more network groups that the approved devices may be associated with. The pre-approved devices may comprise a wireless device that used a login associated with a link (e.g., a QR code as described herein in FIG. 4B). The pre-approved devices may comprise a list generated by a network administrator.

In step 620, a gateway having a specific SSID may receive one or more probe requests, by one or more wireless devices. A probe request may request an authentication of the wireless device, by the gateway, so that the wireless device may connect to the network 300 (e.g., a network group). A probe request, by a wireless device, may comprise the SSID of the gateway, a passkey, and/or an identification (e.g., a MAC ID) of the wireless device. The gateway may determine if the wireless device may be pre-approved to use an alternate encryption protocol. The gateway, in step 622a, may determine that the wireless device may be a pre-approved wireless device 622b, for example, if the identification of the wireless device is a member of the set of pre-approved devices received in step 618. The gateway, in step 622, may determine, alternatively, that the device may not be a pre-approved device 622c, for example, if the identification of the wireless device is not a member of the set of pre-approved devices received in step 618. In step 622a, a gateway may determine to proceed with authenticating a device using a multi-PSK encryption protocol or using a SAE encryption protocol based on the device being or not being a pre-approved device.

A gateway may determine in step 622a that a wireless device may be a pre-approved device 622b. The gateway may determine that the wireless device may be a pre-approved device, for example, based on the device being on a pre-approved device list. The gateway may determine, in step 623, that authentication of the wireless device may be done using an alternate encryption protocol, for example, if the wireless device is a pre-approved device 622b. The gateway may determine the network group (e.g., Guest1, Guest2, PrinterAccess, etc.), and/or the multi-PSK encryption method, of the wireless device, in step 624, using parameters configured in steps 610 and/or 614, for example, if the wireless device is determined to be a member of the set of pre-approved wireless devices in step 622a and the gateway determined to authenticate the wireless device using a multi-PSK encryption method in step 623. Following a determination of the network group authentication of the wireless device using the determined authentication method may be performed (e.g., as described below beginning at step D1 of FIG. 6D).

Also, or alternatively, the gateway may determine in step 622a that a wireless device may not be a pre-approved device 622c. The gateway may determine in step 622a that a wireless device may not be a pre-approved device, for example, based on the device not being on a pre-approved device list. The gateway may continue with SAE encryption in step 625, for example, if the gateway determined that the wireless device is not a pre-approved wireless device 622c in step 622a. A wireless device may not be on a pre-approved device list, if the wireless device did not follow a link to join a network. A wireless device may not be on a pre-approved device list, for example, if the wireless device is choosing a particular SSID (e.g., as described in FIG. 4A) from a list of wireless gateways that the wireless device may be receiving beacons from, rather than following a link to a network sign in page. Authentication of the wireless device using SAE begins at step B1 of FIG. 6B.

Figure 6B:
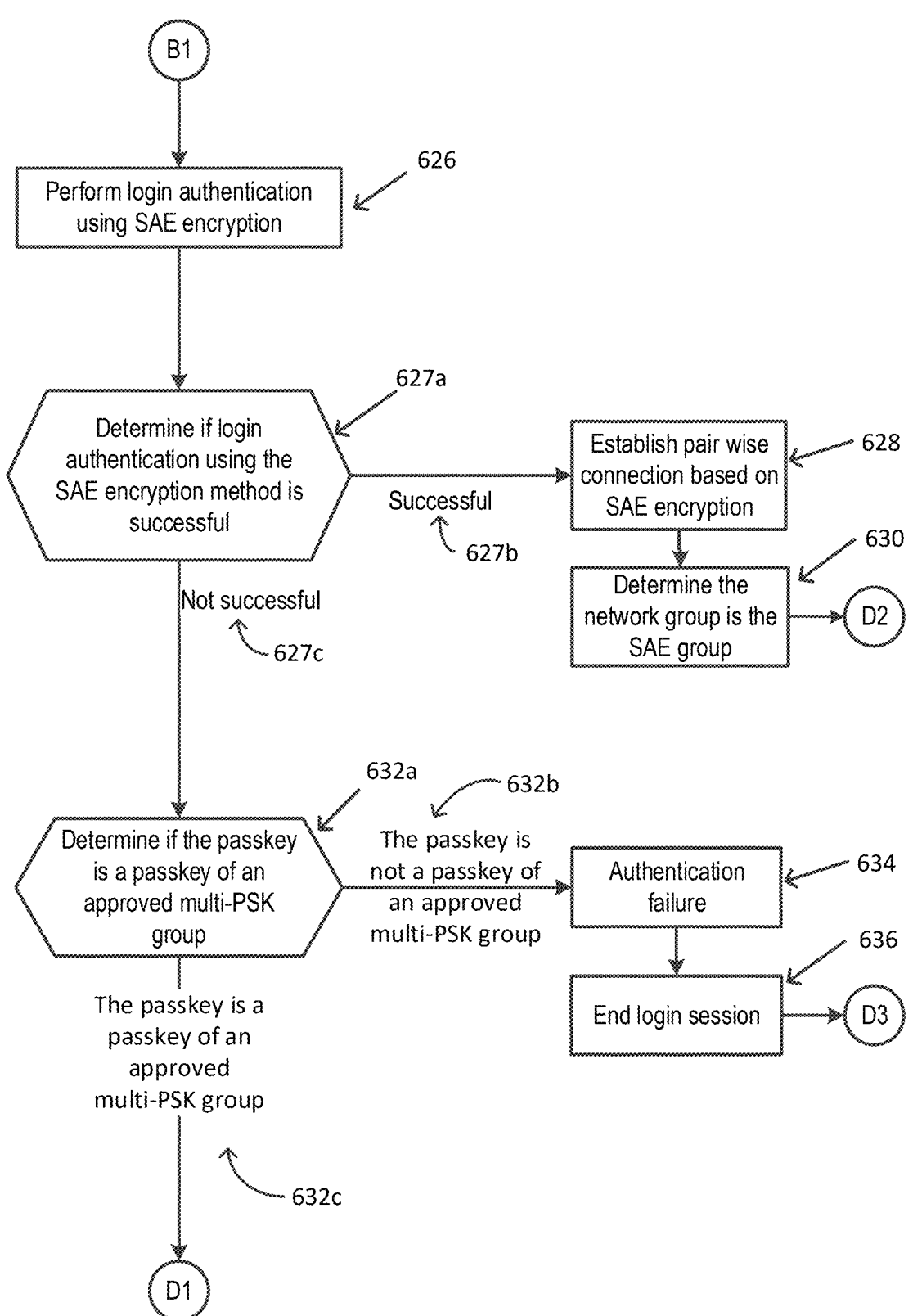

A gateway may proceed with authenticating a wireless device in step 626 of FIG. 6B using SAE encryption. The gateway may use SAE encryption, for example, if the gateway determined in step 622a of FIG. 6A that the wireless device is not a pre-approved device 622c. In FIG. 6B, a gateway, in step 626, may perform a login authentication of a wireless device using an SAE encryption authentication method. The gateway may perform a login authentication, in step 626, of the wireless device using the SAE encryption authentication method using a passkey received from the probe request of the wireless device in step 620 of FIG. 6A, for example, if the gateway determined, in step 622, that the wireless device is not a pre-approved wireless device 622c, and the gateway determined in step 625 to use SAE encryption. The gateway may determine if the login authentication was successful or unsuccessful in step 627a. The gateway may determine a successful SAE authentication in step 627a of FIG. 6B, for example, if a guest device provides the proper SAE passkey in the probe request of step 620. The gateway may establish a pair wise encryption based on SAE encryption, in step 628, and may determine that the network group of the wireless device is the SAE group, in step 630, for example, if the SAE login authentication is successful. Alternatively, the gateway, in step 627a, may determine an unsuccessful SAE authentication 627c of FIG. 6B, for example, if the wireless device provides an incorrect SAE passkey and an incorrect multi-PSK passkey. Also, or alternatively, the gateway, in step 627a, may determine an unsuccessful SAE authentication 627c, for example, if the wireless device provides an incorrect SAE passkey but a correct multi-PSK passkey.

A gateway may be configured to monitor for SAE encryption failures and/or process them differently, as described in step 612b of FIG. 6A. The gateway may compare a passkey included in a probe request, of step 620 of FIG. 6A to multi-PSK configured network groups that the gateway may have been configured with in step 614 of FIG. 6A, for example, if the SAE authentication of the wireless device was unsuccessful 627c of FIG. 6B. The gateway may determine, for example, if the passkey is associated with one of the one or more configured multi-PSK groups of step 614. The gateway may determine, in step 632a, that a network group may be associated with a passkey provided by the wireless device, for example, if the passkey included in a probe request, of a wireless device, of step 620 is a passkey of one of the one or more network groups as configured in step 614. Alternatively, a gateway may determine, in step 632a, that a network group may not be associated with a passkey included, by a wireless device, in a probe request of step 620. The gateway may determine, in step 632a, that a network group may not be associated with a passkey provided by the wireless device, for example, if the passkey the wireless device included in the probe request of step 620 of FIG. 6A associated with a SSID is not a passkey of any of the one or more network groups. The gateway may determine, in step 634, a login authentication failure, for example, if the gateway determines that an approved multi-PSK network group is not associated 632b with the passkey that the wireless device provided in a probe request, in step 620. The gateway may end the login session, in step 636, for example, if the gateway determines, in step 632a, that a network group is not associated with the passkey the wireless device provides in a probe request, in step 620. The gateway may send a message comprising authentication failure to the wireless device.

A gateway may use an encryption method other than an SAE encryption method. The gateway may use a multi-PSK encryption method, for example, if the gateway determined, in step 622 of FIG. 6A, that a wireless device is a pre-approved wireless device, and/or if the gateway determined, in step 632a of FIG. 6B, that a passkey included in a probe request of step 620 of FIG. 6A is a passkey of a multi-PSK network group 632c. Once a gateway determines that a wireless device may be authenticated using an alternative encryption method, the gateway may determine a passkey to use for authentication, the alternative encryption method to use and authenticate the wireless device accordingly. A gateway may perform, for example, in step 650 of FIG. 6D, a login authentication using a login encryption method associated with a network group (e.g., as configured for in step 614 of FIG. 6A) the gateway determined is associated with a passkey a wireless device provides in a probe request in step 620 of FIG. 6A. Alternatively, a gateway may perform a login authentication using a passkey of a network group associated with a wireless device, for example, in step 650 of FIG. 6D, if the gateway determined in step 622a of FIG. 6A that the wireless device is a pre-approved device (e.g., as received in step 618 of FIG. 6A). A gateway may perform, in step 650, an authentication of the wireless device using the alternate authentication protocol with the passkey provided by the wireless device in step 620. The gateway may determine an authentication failure 651b of the wireless device. The gateway may notify the wireless device, in step 652, of the authentication failure, and end the login session of the wireless device in step 654, for example, if the gateway determines the authentication using a multi-PSK is not successful 651b.

A gateway may determine an authentication success 651c of a wireless device, in step 651a, using a determined authentication method with a passkey provided by the wireless device in a probe request of step 620. A gateway may establish, in step 656, pair wise encryption between a wireless device and a network, if the gateway authenticated the wireless device, in step 650, using a determined authentication method and a provided passkey. The gateway may determine a network group of the wireless device based on the multi-PSK groups configured for the gateway in step 614 of FIG. 6A.

A gateway may determine network resources associated with a network group and limit network access of a wireless device based on the network resources. A gateway may determine network resources of a network group, in step 658, for example, if the gateway established a pair wise connection with a wireless device to a network group determined in step 656 (e.g., a multi-PSK group) or in step 630 (e.g., the SAE network group). The gateway may determine the network resources of a network group, for example, in a network group table as described herein in FIG. 5A. Network resources may be limited, for example, to certain connected devices (e.g., printers, scanners, etc.), Internet, and/or certain connected storage devices (e.g., hard drives with movies, videos, and/or digital files). A gateway may limit access of a wireless device to certain network resources (e.g., the gateway may generate session rules). The gateway, for example, may limit access of the wireless device, in step 660, to network resources the gateway determined in step 658. With the session rules established, a gateway and a wireless device may, in step 662, begin exchanging information, and the wireless device may have access to the limited network resources established in step 660. The gateway may store details of the authentication and encryption process (e.g., login details in a device connections table as described herein in FIG. 5B and/or network group table as described herein in FIG. 5C), in step 664.

A gateway may proceed with monitoring probe requests for identified wireless devices and/or monitoring and analyzing SAE authentication failures to determine if an alternative encryption method may be used with a wireless device while the gateway may be operating. The gateway may determine in step 668a if there are additional wireless devices that may be sending probe requests. The gateway may determine the next wireless device in step 670 and continue the method at step A2 of FIG. 6A, for example, if there are additional devices 668a.

Alternatively, a gateway may determine, in step 668a, that there are no additional devices to authenticate 668c. A gateway may also monitor current network groups to determine if they should remain active. The gateway may begin analysis of network group activity on step C1 of FIG. 6C. Available network groups, that a wireless device may connect to, may be active for a limited time or alternatively, may be active indefinitely. A network administrator hosting a party, for example, may only want to provide network access for an evening. A network administrator of a coffee house network, for example, may want to provide network access while the coffee house is open. An administrator may provide a date and time to end the activity of a network group. The administrator may provide a duration of time for the network to remain active.

Figure 6C:
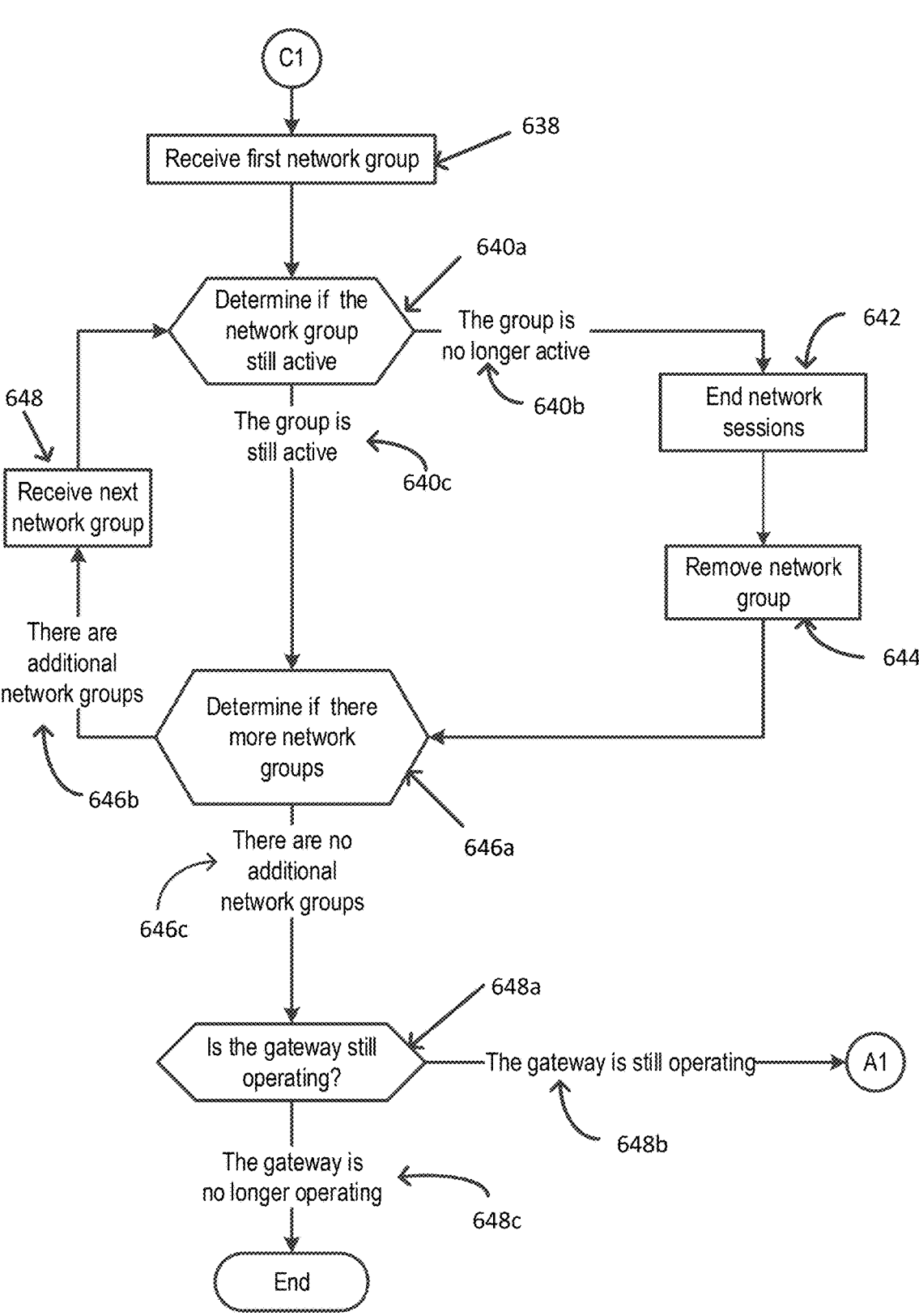
Figure 6D:
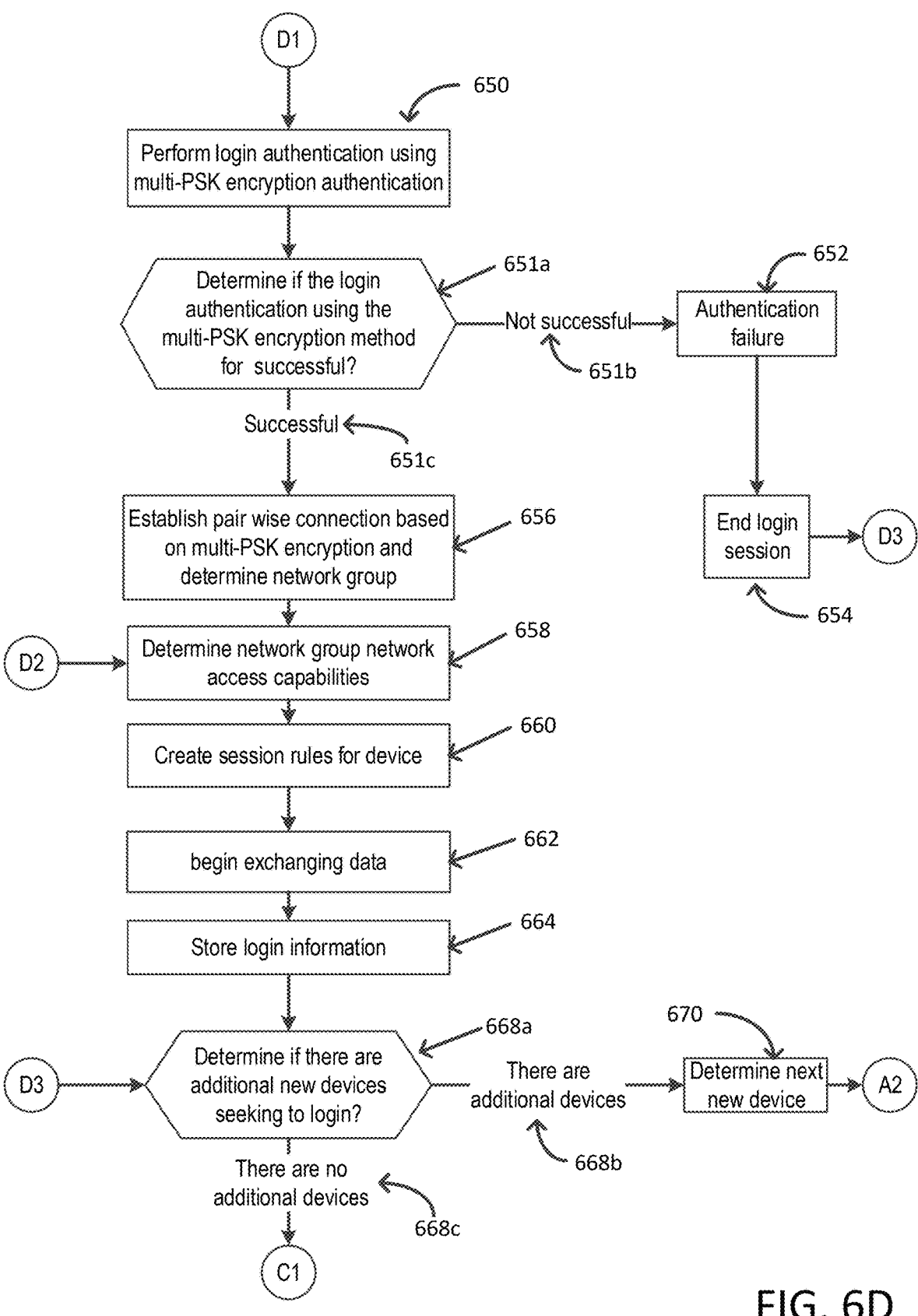

Beginning on step C1 of FIG. 6C, a gateway may proceed through network groups and determine if a network group may no longer be active. A gateway, for example, in step 638 of FIG. 6C, may determine a first network group (e.g., the first network group in a network group table). The gateway may determine, in step 640a, if the network group is still active. The gateway, for example, may determine a network group end from a network group table. The network group end may be a date and time and/or an indication that the network group may exist indefinitely. The gateway may compare the end date and time to the current date and time, for example, if the network group does not exist indefinitely. The gateway may determine the network may no longer be active, for example, if the gateway determines the current date and time is later than the end date and time. A network administrator may end a network group at any time. The network administrator, for example, may end a network group marked indefinite and/or may end a network group with an end time early.

A gateway may end a network session of a network group and/or end connections between a wireless device and a network, if the network group the wireless device may be connected to is no longer active 640b. The gateway may end a network group session, in step 642, for example, if the gateway determined, in step 640a, that a network group is no longer active 640b. Ending a network session may be abrupt with little to no warning. Ending a network session may include a notification of an upcoming end to a connection to wireless devices connected to the network group. A gateway may remove a network group from an active network group list. The gateway, for example, may remove the network group from a network group table. A gateway may indicate a network group may be inactive. The gateway, for example, may indicate the network group is no longer active in a network group table. A gateway may proceed through all active network groups and determine activity. The gateway, for example, may proceed through a list (e.g., a network group table) of network groups, in steps 646 and 648, and determine if the network groups may be inactive. Alternatively, the gateway may determine, step 646a, the network group may still be active 640c.

After determining the activity of the network group, a gateway may determine if more network groups may be checked for continued activity in step 646a. The gateway may determine the next network group in step 648, for example, if there are additional network groups to check for continued activity 646b. Alternatively, the gateway may determine to continue with authenticating devices and maintaining one or more network groups using one or more alternate encryption methods beginning at step A1 of FIG. 6A, for example, if there are no additional network groups 646c and the gateway is still operating 648b as determined in step 648a.

Figure 7A:
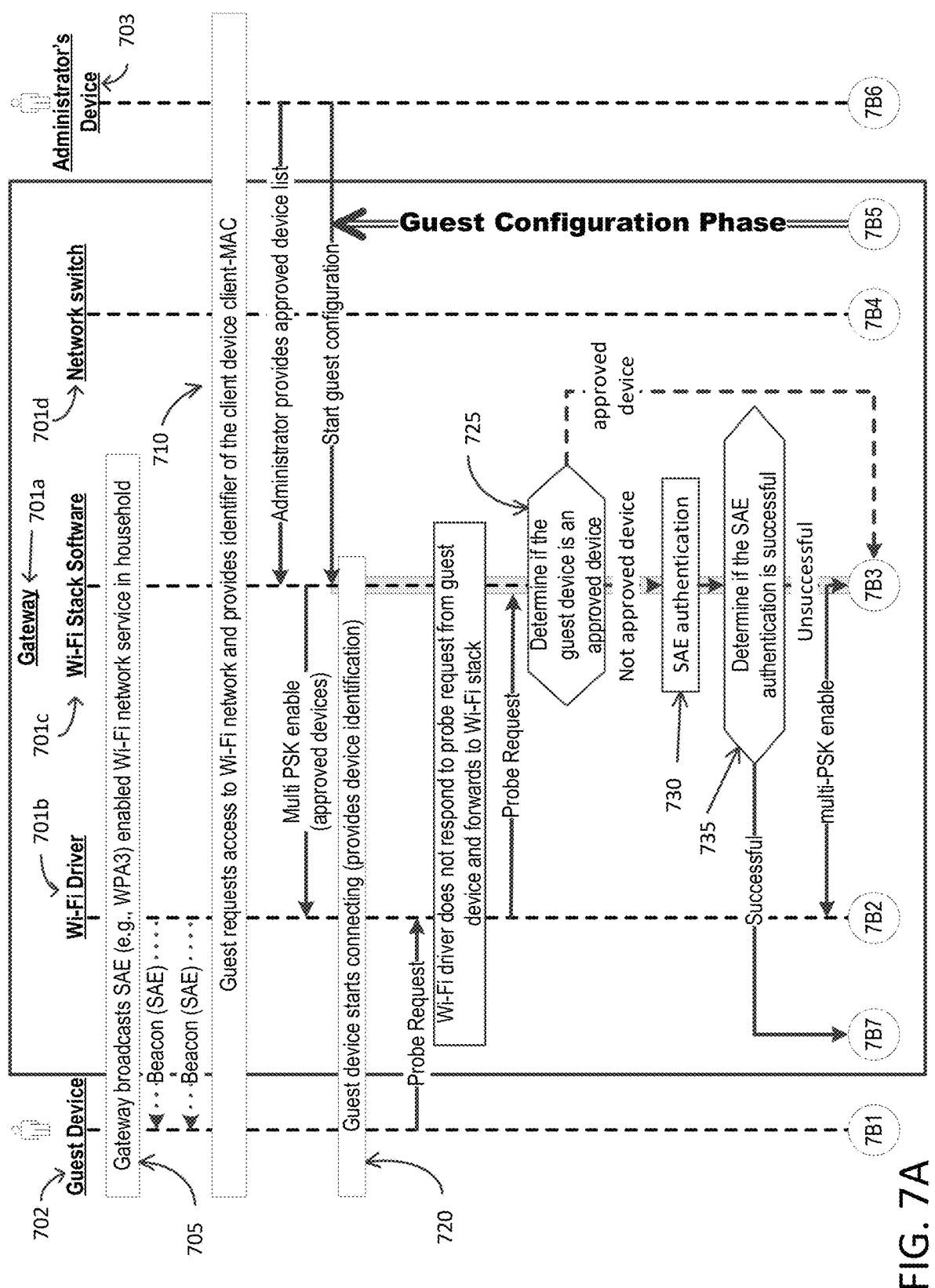
FIGS. 7A and 7B show example communications asso-ciated with an enhanced SAE encryption protocol.
Figure 7B:
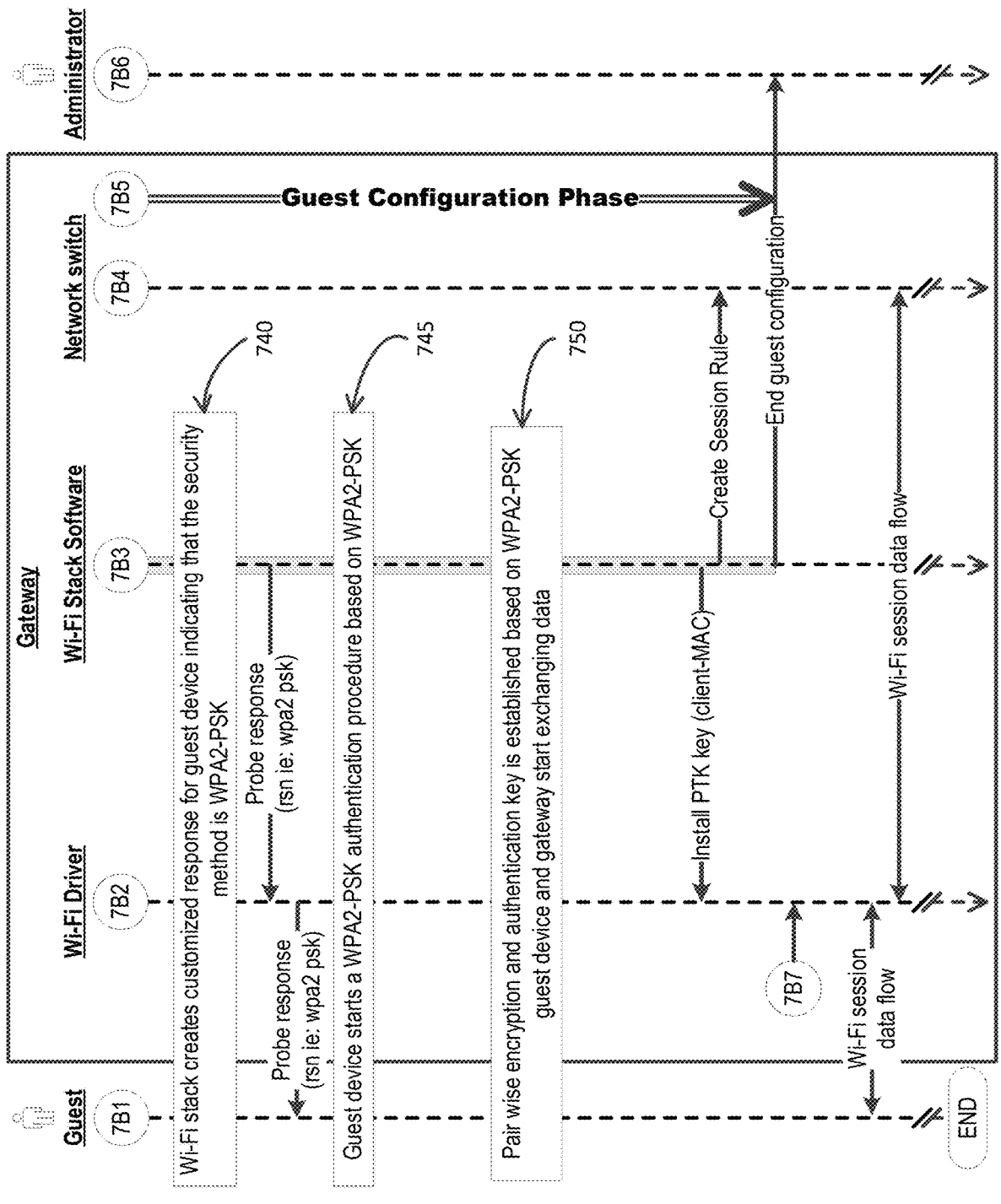

FIGS. 7A and 7B show example communications associated with an enhanced SAE encryption protocol. Communications and steps shown in FIGS. 7A and 7B may correspond to one or more steps described in connection with FIGS. 6A through 6D. A gateway may comprise a Wi-Fi driver, a Wi-Fi stack software, and/or a network switch. The Wi-Fi driver may enable user devices to find and/or connect to the gateway. The Wi-Fi stack software may provide tools so that the gateway may support complex applications that may enhance Wi-Fi connectivity, access point management, and/or communications between wireless devices and the gateway. The network switch may connect devices and/or forward data packets between devices (e.g., the network switch may send data from the router to a specific device). In step 705 of FIG. 7A, a gateway (e.g., a gateway using a method as described herein in FIGS. 6A through 6D), using a Wi-Fi driver, may broadcast a beacon indicating network details (e.g., the network SSID, encryption method used, etc.). In step 710, a guest may request access to a Wi-Fi network. The guest may ask a host to join a Wi-Fi network. The guest may see a sign with an SSID and a passkey (e.g., as described herein in FIG. 4A). The guest may follow a link and/or a QR code (e.g., as described herein in FIG. 4B).

An administrator device may send (e.g., transmit) to the gateway, for use by the Wi-Fi stack software, a message comprising a set of pre-approved guest devices (e.g., a list as described herein in FIG. 5C). The pre-approved guest device list may be updated at periodic intervals (e.g., if a new guest device provides a MAC ID). The administrator device may generate the pre-approved guest device list before sending to the gateway. The approved device list may be generated by a guest device going to a login page and providing identification (e.g., the MAC ID) of the guest device. The pre-approved guest device list may be generated by a guest device following a link (e.g., a QR code as described herein in FIG. 4B) to a webpage that collects the identification (e.g., the MAC ID) of the guest device. The Wi-Fi stack software 701c may provide a list of approved devices, that may use multi-PSK authentication, to the Wi-Fi driver 701b.

A guest device may start connecting with a gateway, in step 720, initiating a guest configuration phase. The guest device 702 may send (e.g., transmit) a probe request to the gateway. The probe request may comprise an identification (e.g., a MAC ID) of the wireless device and/or a passkey. The probe request may comprise an acknowledgment that a broadcast indication of an encryption method to be used, by the gateway, may be used. The Wi-Fi driver 701b does not respond to probe request, but rather forwards the probe request to the Wi-Fi software stack 701c. The probe request may be passed (e.g., sent, transmitted, etc.) from the Wi-Fi driver 701b to the Wi-Fi stack software 701c. The Wi-Fi stack software may determine in step 725 that the guest device may be a pre-approved guest device. The Wi-Fi stack software 701c may compare the identification (e.g., the MAC ID) of the guest device 702 to identifications stored in the pre-approved guest device list. The Wi-Fi stack software 701c may proceed with an SAE pair wise encryption, for example, if the guest device 702 is not a member of the pre-approved guest device list, or alternatively, the Wi-Fi stack software 701c may generate a customized response or, alternatively, proceed with an alternative encryption method (e.g., as described below following step 7B3 in steps 740 through 750), for example, if the guest device is a member of the pre-approved guest device list.

Wi-Fi stack software may proceed with SAE authentication, in step 730, for example, if the Wi-Fi stack software determined, in step 725, that the guest device was not a pre-approved guest device. The Wi-Fi stack software 701c may proceed with SAE pair wise encryption and start exchanging data, for example, if the Wi-Fi stack software 701c successfully authenticates the guest device using SAE encryption in step 735. Alternatively, the Wi-Fi stack software 701c may generate a customized probe response, in step 740 following step 7B3, for example, if the authentication of the gateway with the wireless device using SAE encryption fails in step 735.

A guest device that may be a member of a pre-approved guest device list, as determined in step 725, and/or a guest device that may have failed SAE authentication, as determined in step 730, may use an alternate encryption method (e.g., multi-PSK). Beginning with step 7B3 in FIG. 7B, a customized probe response may be generated in step 740 of FIG. 7B. The probe response may comprise, for example, an indication that the alternate encryption method may be used. The probe response may be sent (e.g., transmitted) by the Wi-Fi stack software 701c to the guest device 702, via the Wi-Fi driver 701b. The guest device 702 and the Wi-Fi stack software 701c may proceed, in step 745, with authentication using the alternate encryption method indicated in step 740 with the passkey provided by the wireless device in a probe request of step 720. The Wi-Fi stack software may send, to the guest device, via the Wi-Fi driver, a message indicating login failure and/or may end the login session with the guest device, for example, if the authentication of the Wi-Fi stack software with the guest device in step 745 fails. Alternatively, the Wi-Fi stack software and the guest device may proceed with establishing a pair wise connection in step 750, for example, if the authentication of the Wi-Fi stack software with the guest device in step 745 is successful. The Wi-Fi stack software may create and send (e.g., transmit) session rules to a network switch in step 760, for example, once a pair wise connection is established in step 750. The session rules may cause the network switch to limit access of network resources (e.g., as described in FIG. 5A) to the guest device based on the network group the guest device connects to. The Wi-Fi stack software may end the guest configuration procedure and/or the network switch may proceed with controlling Wi-Fi session data between the guest device and the gateway.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   receiving, from a wireless device by a gateway offering a connection to a wireless network based on any of a plurality of different wireless encryption protocols, one or more first messages requesting connection to the wireless network, wherein the one or more first messages comprise a passkey and an identifier of the wireless device;
   determining not to allow connection to the wireless network based on the passkey and a first wireless encryption protocol of the plurality of different wireless encryption protocols;
   determining that the passkey is associated with a second wireless encryption protocol of the plurality of different wireless encryption protocols; and
   establishing, using the passkey and the second wireless encryption protocol, a connection between the wireless device and the wireless network.

2. The method of claim 1, further comprising:
   sending, by the gateway, one or more second messages comprising one or more of:
      an indication indicating connection to the wireless network; and
      an indication that the second wireless encryption protocol is used.

3. The method of claim 1, wherein the one or more first messages requesting connection to the wireless network further comprise a wireless network identifier, associated with the wireless network, and an indication that the second wireless encryption protocol is used.

4. The method of claim 1, wherein the first wireless encryption protocol is Wi-Fi protected access 3 using simultaneous authentication of equals (WPA3/SAE) authentication and
   wherein the second wireless encryption protocol is Wi-Fi protected access 2 using multi-pre-share key (WPA2/multi-PSK) authentication.

5. The method of claim 1, wherein the first wireless encryption protocol only allows a single passkey and
   wherein the second wireless encryption protocol allows multiple passkeys.

6. The method of claim 1, further comprising:
   receiving, from a second wireless device, one or more second messages requesting connection to the wireless network, wherein the one or more second messages comprise a second passkey different from the passkey; and
   allowing connection to the wireless network based on the second passkey and the first wireless encryption protocol.

7. The method of claim 1, wherein the passkey is at least based on a wireless network identifier associated with the wireless network.

8. The method of claim 1, further comprising causing, by the gateway, configuration of a switch to deny, based on the identifier of the wireless device, access to one or more network resources.

9. The method of claim 1, further comprising:

determining, based on the identifier of the wireless device, that communication with the wireless device is authenticated using the second wireless encryption protocol.

10. The method of claim 1, further comprising:

controlling access, based on the identifier of the wireless device, to the wireless network, wherein controlling access comprises at least one of:

allowing access to one or more network resources;

duration-limiting access to all of the one or more network resources; or scheduled-limiting access to all of the one or more network resources.

11. The method of claim 1, wherein the gateway comprises a Wi-Fi driver and Wi-Fi stack software, the method further comprising:

sending, by the Wi-Fi driver and to the Wi-Fi stack software, a second message comprising the identifier of the wireless device;

generating, by the Wi-Fi stack software, based on the passkey corresponding to the second wireless encryption protocol, a third message comprising an indication to authenticate a connection based on the second wireless encryption protocol;

sending, by the Wi-Fi stack software and to the Wi-Fi driver, the third message; and sending, by the Wi-Fi driver and to the wireless device, the third message.

12. A method comprising:

sending, by a gateway offering a connection to a wireless network based on any of a plurality of different wireless encryption protocols, one or more first messages comprising an identifier of the wireless network and an indication of a first wireless encryption protocol of the plurality of different wireless encryption protocols;

receiving, from a wireless device, one or more second messages requesting connection to the wireless network, wherein the one or more second messages comprise a first passkey and an identifier of the wireless device;

determining, based on the first passkey, that the first passkey corresponds to a second wireless encryption protocol of the plurality of different wireless encryption protocols;

sending, to the wireless device, based on determining that the first passkey corresponds to the second wireless encryption protocol, one or more third messages comprising an indication that authentication of the wireless device will use the second wireless encryption protocol; and establishing a connection of the wireless device to the wireless network using the second wireless encryption protocol and the first passkey.

13. The method of claim 12, wherein the first passkey is at least based on the identifier of the wireless network.

14. The method of claim 12, wherein the first passkey corresponds to a wireless network group and wherein the wireless network group has access to one or more network resources.

15. The method of claim 12, further comprising:

determining that the identifier of the wireless device corresponds to an identifier of one or more wireless devices pre-approved to connect to the wireless network using one of a plurality of passkeys.

16. The method of claim 12, further comprising controlling access, based on the identifier of the wireless device, to one or more network resources.

17. A method comprising:

receiving, from a wireless device and by a gateway offering a connection to a wireless network based on any of a plurality of different wireless encryption protocols, one or more first messages comprising a passkey and an identifier of the wireless device and requesting connection to a the wireless network;

determining not to allow connection to the wireless network based on the passkey and a first wireless encryption protocol of the plurality of different wireless encryption protocols;

establishing a connection between the wireless device and the wireless network using a second wireless encryption protocol, of the plurality of different wireless encryption protocols, associated with the passkey;

causing, by the gateway, configuration of a network switch to deny, based on the identifier, access to one or more network resources of the wireless network; and sending, to the wireless device, one or more second messages comprising an indication of the connection of the wireless device to the wireless network.

18. The method of claim 17, wherein the causing configuration of the network switch to deny access to the wireless device is further based on the passkey.

19. The method of claim 17, wherein the identifier of the wireless device is a media access control identification (MAC ID).

20. The method of claim 17, wherein the first wireless encryption protocol is Wi-Fi protected access 3/simultaneous authentication of equals (WPA3/SAE) and the second wireless encryption protocol is Wi-Fi protected access 2/multiple pre-shared keys (WPA2/multi-PSK).

* * * * *